United States Patent
Pielsticker et al.

(10) Patent No.: US 11,285,450 B2
(45) Date of Patent: Mar. 29, 2022

(54) METHOD FOR CHARGING AN EXTRUDER

(71) Applicant: TROESTER GMBH & CO. KG, Hannover (DE)

(72) Inventors: Bernd Pielsticker, Wunstorf (DE); Wieland Hoffmann, Hannover (DE); Denys Kamenskyy, Hannover (DE)

(73) Assignee: TROESTER GMBH & CO. KG, Hannover (DE)

( * ) Notice: Subject to any disclaimer, the term of this patent is extended or adjusted under 35 U.S.C. 154(b) by 0 days.

(21) Appl. No.: 16/324,913

(22) PCT Filed: Aug. 9, 2017

(86) PCT No.: PCT/EP2017/070148
§ 371 (c)(1),
(2) Date: Feb. 12, 2019

(87) PCT Pub. No.: WO2018/029236
PCT Pub. Date: Feb. 15, 2018

(65) Prior Publication Data
US 2021/0268459 A1    Sep. 2, 2021

(30) Foreign Application Priority Data
Aug. 12, 2016 (DE) ..................... 10 2016 115 050.9

(51) Int. Cl.
*B01F 15/00* (2006.01)
*B01F 15/02* (2006.01)
(Continued)

(52) U.S. Cl.
CPC ............ *B01F 15/0236* (2013.01); *B01F 3/20* (2013.01); *B01F 15/00129* (2013.01);
(Continued)

(58) Field of Classification Search
CPC ...... B01F 15/0236; B01F 15/025; B01F 7/08; B01F 2215/0049; B01F 3/20; B01F 15/00129
See application file for complete search history.

(56) References Cited

U.S. PATENT DOCUMENTS 3,712,773 A    1/1973  Baumgarten

FOREIGN PATENT DOCUMENTS

DE    1961632 A1    6/1971
DE    2250542 A1    4/1974
(Continued)

OTHER PUBLICATIONS

JP2004262194 Machine Translation (Year: 2009).*

*Primary Examiner* — Anshu Bhatia
(74) *Attorney, Agent, or Firm* — Leydig, Voit & Mayer, Ltd.

(57) ABSTRACT

A method for charging at least one extruder with at least one material web including rubber and/or plastics mixtures includes: transporting the at least one material web, at a distance from at least one material feed of the at least one extruder, into a region of a material feed, in each case by a conveying device; and receiving and/or processing and introducing, by at least one handling device having at least one tool, an initial region of the at least one material web into the at least one material feed of the at least one extruder. At least the at least one extruder, the conveying device, and the at least one handling device comprise a production plant.

15 Claims, 4 Drawing Sheets

(51) Int. Cl.
  *B01F 3/20* (2006.01)
  *B01F 7/08* (2006.01)
(52) U.S. Cl.
  CPC .............. *B01F 15/025* (2013.01); *B01F 7/08* (2013.01); *B01F 2215/0049* (2013.01)

(56) References Cited

FOREIGN PATENT DOCUMENTS

| | | |
|---|---|---|
| DE | 2364539 A1 | 7/1975 |
| DE | 2746187 B1 | 4/1979 |
| DE | 3841752 C1 | 6/1990 |
| EP | 0374082 A2 | 6/1990 |
| GB | 1486818 A | 9/1977 |
| GB | 2006090 A | 5/1979 |
| GB | 2024095 A | 1/1980 |
| JP | S 59107224 U | 7/1984 |
| JP | H 09174654 A | 7/1997 |
| JP | 2004262194 A | 9/2004 |

\* cited by examiner

METHOD FOR CHARGING AN EXTRUDER

CROSS-REFERENCE TO PRIOR APPLICATIONS

This application is a U.S. National Phase application under 35 U.S.C. § 371 of International Application No. PCT/EP2017/070148, filed on Aug. 9, 2017, and claims benefit to German Patent Application No. DE 10 2016 115 050.9, filed on Aug. 12, 2016. The International Application was published in German on Feb. 15, 2018 as WO 2018/029236 under PCT Article 21(2).

FIELD

The invention relates to a method for charging at least one extruder with at least one material web—in particular, made of rubber and/or plastics mixtures—wherein the particular material web is transported, at a distance from at least one material feed of the particular extruder, into the region of said material feed, in each case by means of a conveying device.

BACKGROUND

Feeding material to extruders—in particular, screw extruders—usually occurs in the form of strips of material, wherein such a strip, which is folded over in the shape of a meander and provided on a pallet, is processed.

Such material strips, also referred to as fibers, which are formed characteristically from thermoplastics, thermoplastic elastomers, or rubber mixtures or natural rubber, are conveyed to the extruder by means of conveyor belts and fed to the extruder via a generally funnel-shaped feed opening. Such a procedure is, inter alia, described in DE 23 64 539 A1.

In this case, the introduction of such a fiber, which is conveyed to the extruder by means of a conveyor belt, into the feed opening of the extruder takes place by hand, wherein a machine operator inserts the conveyed end of the fiber into the feed opening of the extruder. Then, the fiber—possibly, also two or more fibers—continues to move as a result of the conveying action of the screw, until the pallet is emptied.

Because of labor protection regulations, the feed opening—usually a funnel shaft—must be designed, with respect to the manual feeding of the fiber, in such a way that body parts of the machine operator, such as a finger or hand, cannot reach the processing part of the extruder—in particular, the screw.

For this purpose, for one, the funnel opening can be designed to be so narrow that a finger cannot be introduced. However, as this is an extremely disadvantageous design for introducing a fiber, the shaft length of the funnel shaft is chosen such that body parts cannot reach the extruder screw. Nevertheless, a limitation of the cross-section is also necessary in this case, so that, for example, the entire body cannot reach through the funnel opening into the machine interior.

As a result of this cross-section limitation, processing the end of the fiber to be introduced into the funnel shaft is indispensable, since the width of the fibers usually exceeds the cross-section length and/or width of the funnel opening. The processing of the end to be introduced then takes place in such a way that the end tapers as sharply as possible—inter alia, by cutting or rolling—in order to ensure easy introduction.

This action must, for example, always take place when a fiber end is reached, a fiber tears off due to a change in cross-section resulting from the production process of the fiber, or foreign objects in the fiber must be removed.

In order to circumvent a feed designed in this way, DE 38 41 752 C1 describes a system wherein the fibers arranged on pallets are comminuted prior to being fed into the funnel shaft of a screw extruder, and these comminuted pieces pass through a magnetic separation and a further foreign-object separation. Pieces contaminated with foreign objects can thereby be sorted out. In this case, preferably three fibers are first fed via conveyor belts to a comminutor, after which the comminuted fiber pieces pass along the magnetic separator via a further conveyor belt. An additional conveyor belt for this purpose feeds the pieces to the foreign-object separation, and lastly to the funnel shaft of the extruder. It is clearly apparent in this case what dimensions such a plant has; the space requirement is enormous. It is also necessary to comminute the fibers into pieces before feeding them to the extruder.

Furthermore, efforts were made to implement differently designed feeds. From DE 27 46 187 B1, for example, is known a device for the controlled feeding of a strip-shaped rubber mixture into the feed opening of a screw machine with a funnel-shaped feeder shaft arranged between a feeding device and the feed opening. A pendulum-type flap acted upon by a constant tilting moment covers the entire passage cross-section of the feeder shaft. In the end of the pendulum-type flap protruding from the feeder shaft on the rear side, a switching device, for triggering switching pulses for controlling the feeding device by means of fixed proximity switches, is provided. A disadvantage of such an implementation is, however, again, the complex division of a fiber into fiber sections.

SUMMARY

In an embodiment, the present invention provides a method for charging at least one extruder with at least one material web comprising rubber and/or plastics mixtures, comprising: transporting the at least one material web, at a distance from at least one material feed of the at least one extruder, into a region of a material feed, in each case by a conveying device; and receiving and/or processing and introducing, by at least one handling device having at least one tool, an initial region of the at least one material web into the at least one material feed of the at least one extruder, wherein at least the at least one extruder, the conveying device, and the at least one handling device comprise a production plant.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

With that said, in an embodiment the aim of the invention is to provide a possibility of implementing an automated feeding of material webs into an extruder, without the need for comminution of the material webs.

According to the invention, a method is thus provided for charging at least one extruder with at least one material web—in particular, made of rubber and/or plastics mixtures—wherein the particular material web is transported, at a distance from at least one material feed of the particular extruder, into the region of said material feed, in each case by means of a conveying device. Essentially, by means of at least one handling device having at least one tool, an initial region of the particular material web is received and/or processed and introduced into the material feed of the at least one extruder. At least the at least one extruder, the particular conveying device, and the at least one handling device form a production plant in this case. Thus, in principle, one or more handling devices, which can be designed, for example, as a robot—in particular, as an industrial robot—may be involved in the charging of one or more extruders. The extruders may be designed, inter alia, as screw extruders and/or co-extruders. It is envisaged that the handling device or handling devices lift off the material webs—also called fibers—transported thereto via one or more conveying devices, at least from the conveying device, e.g., a conveyor belt, belt conveyor, or the like, and introduce them into the material feed of the extruder. In addition, the material web can be processed prior to introduction, by means of at least one tool arranged on the handling device. The processing can be carried out in such a way that the initial region of the material web facing the material feed and positioned at a distance is present in a substantially tapered state after processing.

In different embodiments of the invention, it is conceivable that, on the one hand, a single handling device, for example, charges several extruders with material webs, which are transported into the region of the particular material feed via a number of conveying devices equal to the number of extruders or material feeds of a co-extruder. In such a case, it would also be reasonable to design the handling device to be height-adjustable, in order to receive and/or process material webs, which are transported thereto by conveying devices with different conveyor end heights. On the other hand, it is also conceivable that one handling device each per extruder or material feed of a co-extruder and conveying device be used.

In addition to this standard charge, there is the possibility that, in the event of a disturbance, such as a tearing-off of the material web, the beginning of the remaining material web located on the conveying device is again received and introduced into the material feed by the handling device.

The initial region of a particular material web can, in either case, be received by means of a suction or vacuum gripper, for example.

In a particularly advantageous development of the invention, the production plant is switched off when a person enters a safety area surrounding the production plant. This makes it possible to change the design of the material feed, for example. In contrast to a cross-sectionally limited, long funnel shape, it would be conceivable to work with smaller lengths of the funnel, or even to dispense with a funnel shape and to design the material feed such that a material web can be introduced directly into the material feed, even without processing. Furthermore, danger to the entering person from the handling device or handling devices can be avoided.

A further profitable embodiment of the invention is based upon the fact that the position of the initial region of the material web located on the particular conveying device is detected. This could be carried out by means of an optical recording, e.g., by a camera, and a downstream image-processing unit, which makes it possible to always determine the current position of the initial region of a material web, thereby enabling regulation of the handling device.

It would, furthermore, be possible to also determine deviating positions of a material web and to receive and/or process them by means of the handling device.

It is also advantageous when the initial region of the particular material web is cut by means of a tool—in particular, a cutting tool—of the handling device at an acute angle to the longitudinal direction of the material web. It is conceivable in this case that the initial region of the material web is cut on one side or on both sides, so that a triangular or trapezoidal shape with a short base side results. By means of such a design, the initial region is substantially tapered, which facilitates the introduction into the material feed.

It is also practical when the initial portion of the particular material web is rolled into a cone shape by means of a tool of the handling device and/or by means of the handling device itself. Such a conical rolling of the material web likewise advantageously allows easier introduction of the material web into the material feed of a particular extruder. In this case, it is conceivable that solely the tool located on the handling device performs the rolling of the material web—that this rolling is carried out by a movement of the handling device itself, while, for example, the material web is merely held by the tool—or else that a combination of tool and movement of the handling device brings about this rolling.

A further advantageous development consists in the initial region of the particular material web being folded by means of a tool of the handling device and/or by means of the handling device itself. This provides a further possibility of simplifying the introduction of the material web into the material feed of a particular extruder. The folding can produce a triangular or trapezoidal shape of the initial region of the material web in a similar manner to that already described. In this case, it is again possible for the folding to be carried out by means of a tool alone, by means of movements of the handling device, or by a combination thereof.

If the initial region of the particular material web is received by means of a tool—in particular, a gripper—of the handling device in an interruption, provided for this purpose, of the particular conveying device, this is to be regarded as profitable, to the extent that this interruption simplifies, or allows, the reception process. As a result of this embodiment, a tool designed as a two- or multi-finger gripper could be used, which is an alternative to the use of a suction gripper or vacuum gripper. A two-finger gripper could easily receive the material web laterally in the interruption; a movement of a gripper finger between material web and conveying device would not be necessary. The interruption does not constitute an obstacle to the transport of the material web, since the material web has sufficient rigidity, such that crossing the interruption is easily possible.

Additionally, if the initial region of the particular material web is received by means of a tool—in particular, a gripper—of the handling device at an angle to the longitudinal direction of the particular material web, this is to be regarded as extremely expedient. The initial region of a particular material web is thus not received in parallel or orthogonally to the longitudinal direction of the material web. When using a two- or multi-finger gripper for receiving the initial region of a particular material web, it is thereby conceivable for the reception to be able to take place in a smooth movement during the transport, with the material web still in motion.

In a further promising embodiment, defective sections or sections, contaminated with foreign objects, of the particular material web, which are present on the particular conveying device as sections separated from the positive material bond of the particular material web by a detection and separation device, are removed from the material web by means of a tool—in particular, a gripper—of the handling device. Thus, contaminated parts of the material web cannot get into the production process, and separation before charging can be dispensed with, which results in a cost saving. It would be possible to arrange the detection and separation device on a particular conveying device, by means of which the defective and/or contaminated sections are cut out of the material web, for example. Thereafter, the separated sections would initially stay on the conveyor and subsequently be sorted out—for example, by means of a gripper of the handling device.

In this connection, it is also advisable for defective sections and/or sections, contaminated with foreign objects, of the particular material web, by means of at least one tool—in particular, a separation device and/or a gripper—of the handling device, to be separated from the material bond of the particular material web and removed from the material web. By means of such a procedure, an additional separation device could be dispensed with, and only detection of defective and/or contaminated sections would have to take place. These sections would be separated from the material web and sorted out by means of a single tool or separate tools of the handling device.

An embodiment in which sections removed from the particular material web are deposited by the handling device on a removal conveying device and conveyed out of the safety area of the production plant by means of the removal conveying device is predestined such that a continuous production process takes place. As a result of the removal from the safety area of the production plant, it is not necessary for the production to be interrupted in order for a person to get into the safety area and remove the sections manually. Such conveying device can, for example, also be designed as a conveyor belt.

Furthermore, if the processed initial region of a particular material web is introduced into the material feed of a particular extruder in a force-controlled or force-regulated manner, it can largely be precluded that excess charging of the material feed of an extruder takes place by the handling device. Among other things, it would, advantageously, be possible that the end of a material web, not yet completely processed and at least partially still located in the material feed of the extruder, be detected, and a material jam in the material feed thus prevented, for example.

It is also to be considered useful for the tool—in particular, a roller gripper—of the handling device, which receives the initial region of a particular material web, to allow only a feed of the material web directed in the direction of insertion of the material feed, as a result of which backward movement of the received material web can profitably be prevented. A disturbance, such as a collision of a backward moving material web with a newly-fed material web, could thereby be prevented.

A particularly advantageous development furthermore consists in a change of the at least one tool of the handling device taking place, depending upon a process step to be carried out. A process step can in this case comprise, for example, the reception and/or processing and introduction of the initial region of the particular material web into the material feed, or the separation, removal, and/or deposition of sections of the material web. It is to be regarded as practical in this case that the handling device has, for this purpose, a tool holder which can alternately be equipped with various tools, wherein the tools are stored in a tool changer arranged away from the handling device. However, it is also conceivable for the tool holder to be designed as a tool turret, in which several tools are already arranged.

It is also advisable when the handling device carries out learned movement sequences or when a manual operation of the handling device takes place. In this case, the learned movements can represent standard movement sequences, i.e., movement sequences which, in the normal case of charging, are carried out by the handling device, or include such disturbance movement sequences as occur in the event of a disturbance—for example, the tearing-off of a material web. In addition to these learned movement sequences, there should be the possibility of manually operating a handling device in order, for example, to eliminate a disturbance that is not covered by the learned movement sequences, or to allow any other necessary error correction. For this purpose, it may be considered useful that the movements of the handling device or handling devices are transmitted by means of an optical system, such as a camera, and that a remote control takes place—by way of example, by means of a joystick—from an area outside the safety area.

Figure 1:
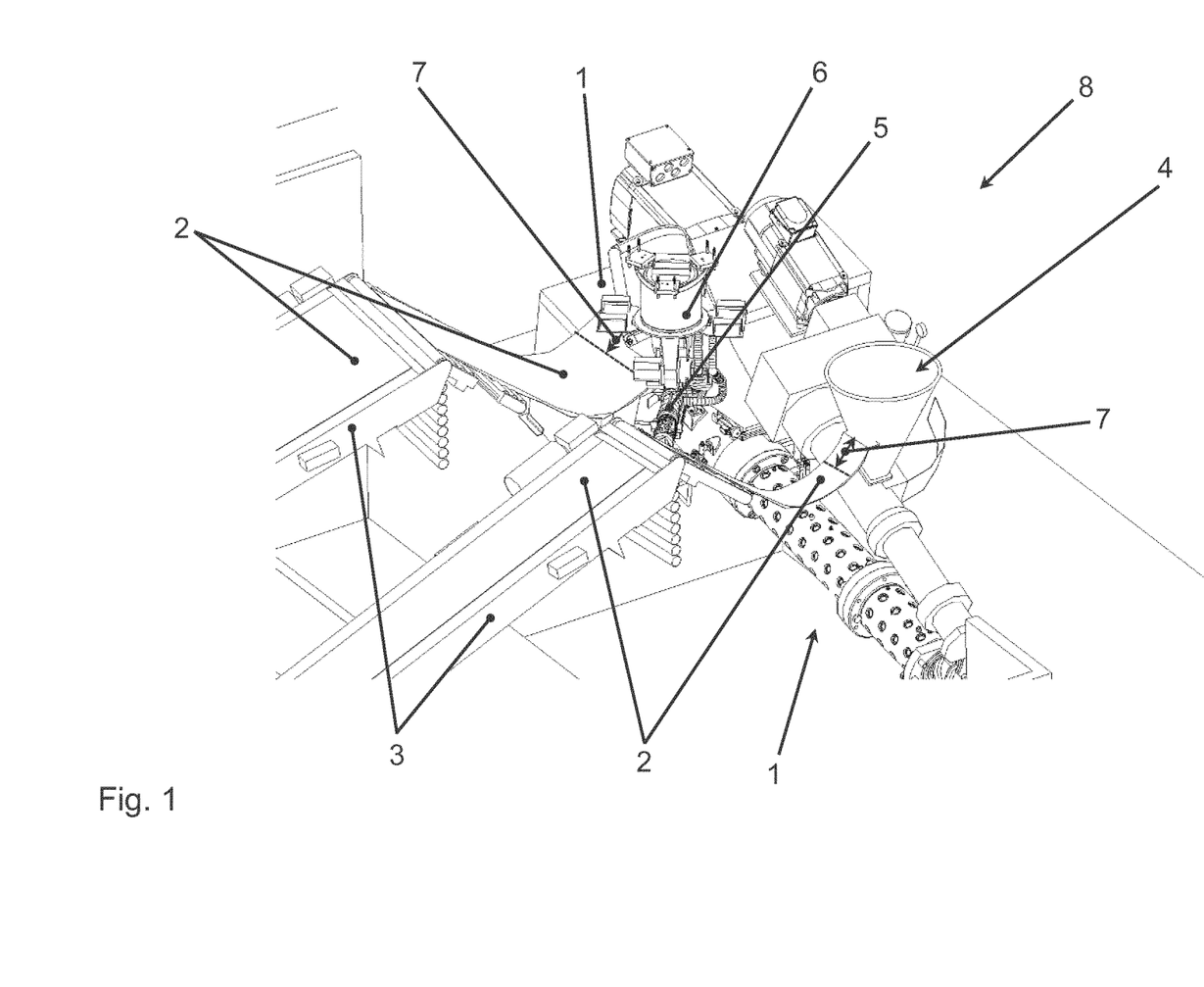
FIG. 1 shows an arrangement for carrying out the method according to the invention.

FIG. 1 shows one possible arrangement in carrying out the method according to the invention. Shown is an extruder 1 which is designed as a co-extruder and has two material feeds 4. The initial regions 7 of the material webs 2 were introduced into these material feeds 4 by means of the tool 5, designed as a roller gripper, of the handling device 6 designed as a robot, wherein these initial regions 7 were first received and processed by the conveying device 3. It should be noted that only a feed of the material web 2 directed in the direction of insertion of the material feed 4 is made possible by the tool 5 designed as a roller gripper. In a preceding step, these material webs 2 were transported with the conveying device 3, formed as conveyor belts at a distance from the material feeds 4, into the region of these material feeds 4. The extruder 1, the particular conveying device 3, and the handling device 6 in this case form the production plant 8.

Figure 2:
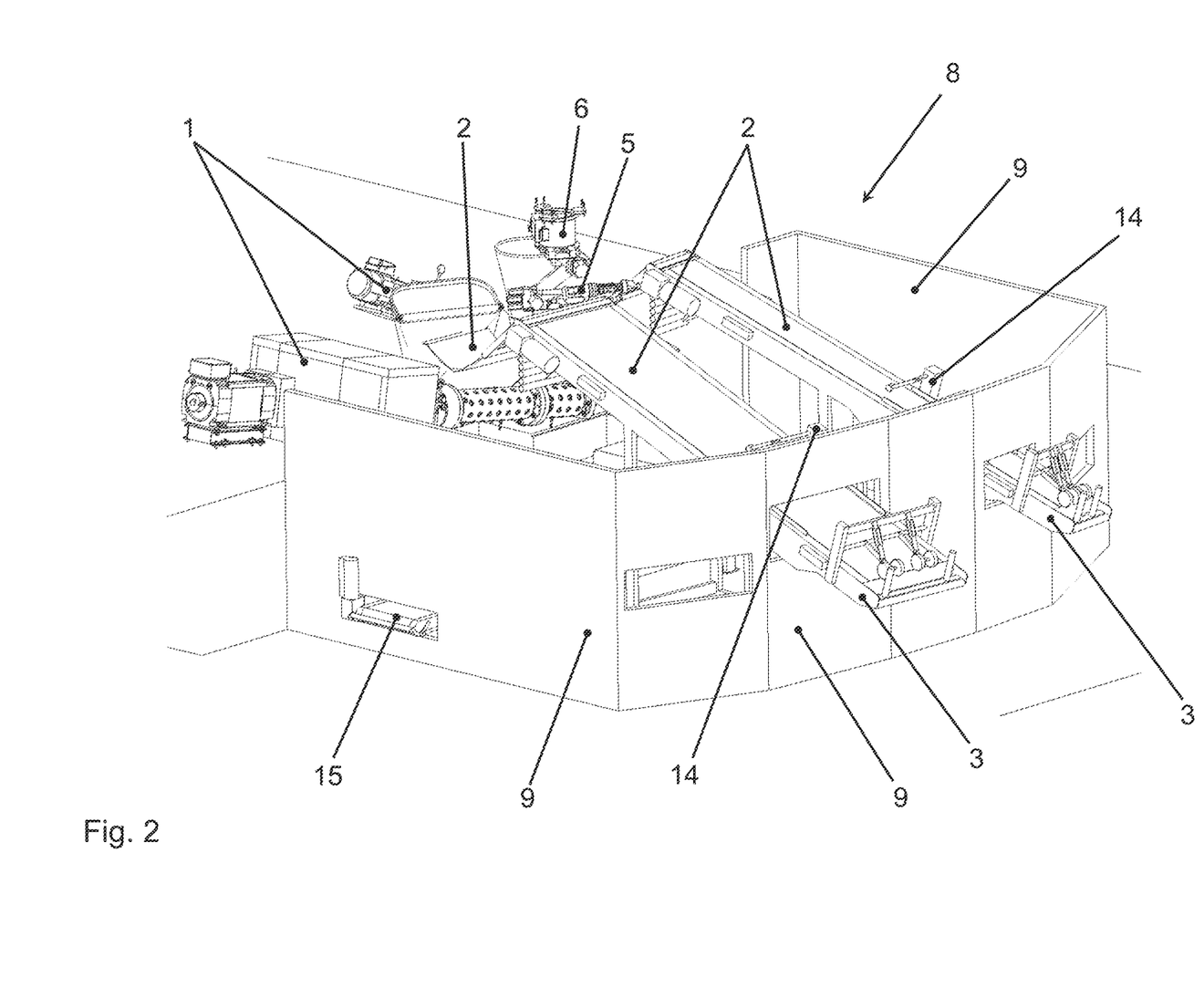
FIG. 2 shows an illustration of the production plant.

FIG. 2 shows an illustration of the production plant 8 with the extruder 1, as well as the handling device 6 and four conveying device 3. The conveying devices 3 are each provided with an associated detection and separation device 14. The safety area 9 surrounding the production plant 8 is also marked. The removal conveying device 15, which is designed as a conveyor belt, is arranged in such a way that it is partially in the safety area 9, and partially outside the safety area 9. This arrangement makes it possible, by means of the particular detection and separation devices 14, to remove sections separated from the positive material bond of the particular material webs 2 from the safety area 9. For this purpose, the detached sections of the particular material webs 2 are received by means of the tool 5 of the handling device 6 designed as a gripper, and deposited on the removal conveying device 15.

Figure 3:
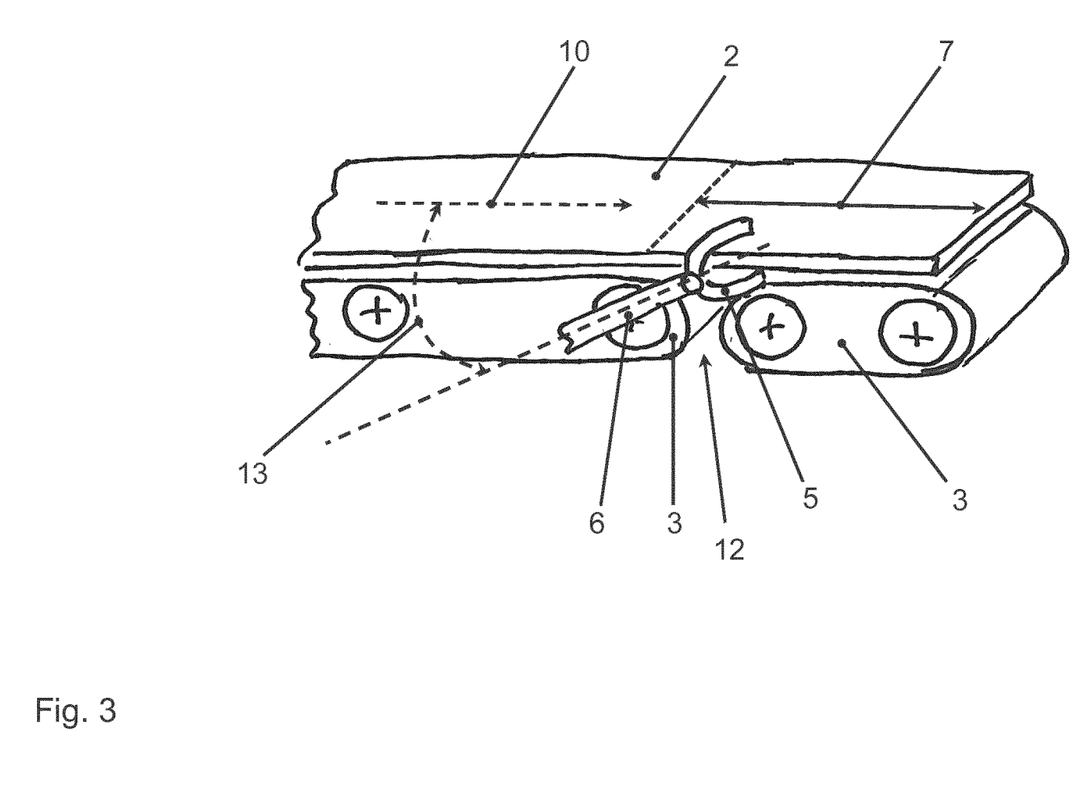
FIG. 3 shows a conveyor belt, with interruption.

FIG. 3 shows a conveying device 3 formed as a conveyor belt, wherein reception of the initial region 7 of the material web 2 takes place by means of the tool 5 of the handling device 6, designed as a two-finger gripper, in the interruption 12, provided for this purpose, of the conveying device 3 at the angle 13 to the longitudinal direction 10 of the material web 2.

Figure 4:
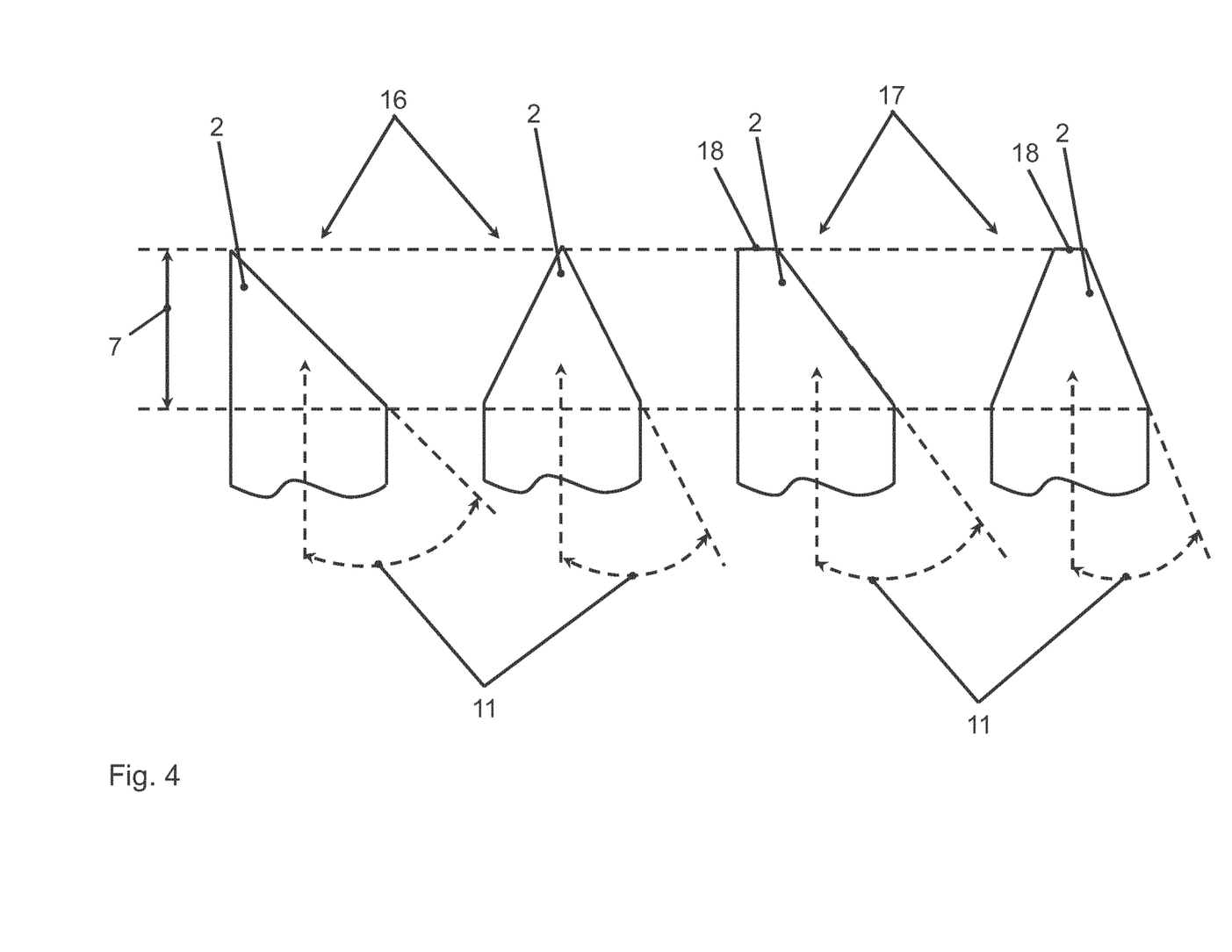
FIG. 4 shows illustrations of material webs.

FIG. 4 shows four material webs 2 in which the initial region 7 of the particular material web 2 is cut at an acute angle 11 to the longitudinal direction 10 of the material web 2. The initial regions 7 of the material webs 2 are cut on one side or on both sides, so that a triangular shape 16 or trapezoidal shape 17 with a short base side 18 results. As a result of such a design, the initial regions 7 of the material webs 2 are substantially tapered.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Extruder
2 Material web
3 Conveying device
4 Material feed
5 Tool
6 Handling device
7 Initial region
8 Production plant
9 Safety area
10 Longitudinal direction
11 Angle
12 Interruption
13 Angle
14 Detection and separation device
15 Removal conveying device
16 Triangular shape
17 Trapezoidal shape
18 Base side

The invention claimed is:

1. A method for charging at least one extruder with at least one material web comprising rubber and/or plastics mixtures, comprising:
   transporting the at least one material web, at a distance from at least one material feed of the at least one extruder, into a region of a material feed, in each case by a conveyor belt; and
   receiving and/or processing and introducing, by at least one handling device having at least one tool configured as a gripper, an initial region of the at least one material web lifted from the conveyor belt into the at least one material feed of the at least one extruder by the gripper,
   wherein at least the at least one extruder, the conveyor belt, and the at least one handling device comprise a production plant.

2. The method according to claim 1, further comprising switching off the production plant when a person enters a safety area surrounding the production plant.

3. The method according to claim 1, further comprising detecting a position of the initial region of the at least one material web located on the conveyor belt.

4. The method according to claim 1, further comprising cutting the initial region of the at least one material web by a cutting tool of the at least one handling device at an acute angle to a longitudinal direction of the at least one material web.

5. The method according to claim 1, further comprising rolling the initial region of at least one material web into a cone shape by the tools of the at least one handling device and/or by the at least one handling device itself.

6. The method according to claim 1, further comprising folding the initial region of the at least one material web using the at least one tool of the at least one handling device and/or using the at least one handling device itself.

7. The method according to claim 1, wherein a reception of the initial region of the at least one material web takes place by the gripper of the at least one handling device during an interruption of the at least one conveyor belt.

8. The method according to claim 1, wherein a reception of the initial region of the at least one material web takes place by the gripper of the at least one handling device at an angle to a longitudinal direction of the at least one material web.

9. The method according to claim 1, further comprising removing from the at least one material web defective sections and/or sections contaminated with foreign objects, which are present on the conveyor belt as sections separated from a positive material bond of the at least one material web by a detection and separation device,
   wherein the removing is performed by the gripper of the at least one handling device.

10. The method according to claim 9, further comprising depositing, by the at least one handling device, sections that are removed from the at least one material web on a removal conveyor belt, and conveying the sections out of a safety area of the production plant by the removal conveyor belt.

11. The method according to claim 1, further comprising separating from a material bond of the at least one material web and removing from the at least one material web defective sections of the at least one material web and/or sections of the at least one material web that are contaminated with foreign objects,
   wherein the separating and removing are performed by a separation device of the handling device and/or the gripper of the at least one handling device.

12. The method according to claim 1, wherein the processed initial region of the at least one material web is introduced into the material feed of the at least one extruder in a force-controlled or force-regulated manner.

13. The method according to claim 1, wherein, by the gripper of the handling device receiving the initial region of the at least one material web, only a feed of the at least one material web directed in a direction of insertion of the material feed is made possible.

14. The method according to claim 1, wherein the tool of the handling device is changed depending upon a process step to be carried out.

15. The method according to claim 1, wherein the at least one handling device executes learned movement sequences, or
  wherein a manual operation of the at least one handling device takes place.

\* \* \* \* \*